United States Patent
Martinelli

(10) Patent No.: US 8,994,349 B2
(45) Date of Patent: Mar. 31, 2015

(54) SYNCHRONOUS RECTIFIER BI-DIRECTIONAL CONVERTER

(75) Inventor: Robert Matthew Martinelli, Murrieta, CA (US)

(73) Assignee: The Boeing Company, Chicago, IL (US)

( * ) Notice: Subject to any disclaimer, the term of this patent is extended or adjusted under 35 U.S.C. 154(b) by 77 days.

(21) Appl. No.: 12/959,397

(22) Filed: Dec. 3, 2010

(65) Prior Publication Data

US 2012/0140526 A1    Jun. 7, 2012

(51) Int. Cl.
*G05F 1/00* (2006.01)
*H02M 3/158* (2006.01)
*H02J 7/35* (2006.01)

(52) U.S. Cl.
CPC .............. *H02M 3/1582* (2013.01); *H02J 7/35* (2013.01); *H02M 3/1588* (2013.01); *Y02B 70/1466* (2013.01)
USPC ........................................................ 323/282

(58) Field of Classification Search
CPC ............................. H02M 3/156; H02M 3/1588
USPC ......... 323/222, 223, 224, 265, 282, 284, 285, 323/350, 235, 239, 319, 324
See application file for complete search history.

(56) References Cited

U.S. PATENT DOCUMENTS

| | | | |
|---|---|---|---|
| 3,816,804 A | 6/1974 | Cardwell, Jr. | |
| 5,940,287 A * | 8/1999 | Brkovic | 323/283 |
| 6,617,831 B2 * | 9/2003 | Perol | 323/234 |
| 6,657,419 B2 * | 12/2003 | Renyolds | 323/285 |
| 6,850,426 B2 * | 2/2005 | Kojori et al. | 363/123 |
| 6,961,253 B1 * | 11/2005 | Cohen | 363/89 |
| 7,254,047 B2 * | 8/2007 | Ren et al. | 363/21.14 |
| 7,301,288 B2 * | 11/2007 | Green | 315/291 |
| 7,746,042 B2 * | 6/2010 | Williams et al. | 323/223 |
| 2002/0135341 A1 * | 9/2002 | Eagar | 323/282 |
| 2004/0070377 A1 * | 4/2004 | Bai et al. | 323/282 |
| 2007/0230228 A1 * | 10/2007 | Mao | 363/89 |
| 2008/0074093 A1 * | 3/2008 | DeWitt et al. | 323/282 |
| 2009/0206812 A1 * | 8/2009 | Sasaya et al. | 323/282 |
| 2010/0237840 A1 * | 9/2010 | Walter et al. | 323/282 |

* cited by examiner

*Primary Examiner* — Adolf Berhane
*Assistant Examiner* — Alex Torres-Rivera
(74) *Attorney, Agent, or Firm* — Ameh IP; Lowell Campbell; Elahe Toosi

(57) ABSTRACT

A system and method for bi-directional voltage conversion are disclosed. A charge current is received at a first voltage on a first force commutated synchronous rectifier, and the charge current is controlled by the first force commutated synchronous rectifier. An inductor is charged by the charge current, and a discharge current from the inductor is controlled by the second force commutated synchronous rectifier.

20 Claims, 6 Drawing Sheets

SYNCHRONOUS RECTIFIER BI-DIRECTIONAL CONVERTER

FIELD

Embodiments of the present disclosure relate generally to voltage converters. More particularly, embodiments of the present disclosure relate to bi-directional voltage converters.

BACKGROUND

A DC-to-DC converter is an electronic circuit which converts a source of direct current (DC) from one voltage level to another. It is a class of power converter. DC to DC converters are important in portable electronic devices such as cellular phones and laptop computers, which are supplied with power from batteries primarily. Such electronic devices often contain several sub-circuits, each with its own voltage level requirement different from that supplied by the battery or an external supply (sometimes higher or lower than the supply voltage). Switched DC to DC converters offer a method to increase voltage from a partially lowered battery voltage thereby saving space instead of using multiple batteries to accomplish the same thing. Most DC to DC converters also regulate the output voltage. A step-up/boost converter is a power converter with an output DC voltage greater than its input DC voltage. It is a class of switching-mode power supply (SMPS) containing at least two semiconductor switches (a diode and a transistor) and at least one energy storage element. Filters made of capacitors (sometimes in combination with inductors) are normally added to an output of the step-up/boost converter to reduce output voltage ripple. A step-down/buck converter is a power converter with a DC output voltage lower than its DC input voltage. The step-down/buck converter design is similar to the step-up boost converter, and like the step-up/boost converter it is a switched-mode power supply that uses two switches (a transistor and a diode), an inductor and a capacitor.

SUMMARY

A method for bi-directional voltage conversion is disclosed. A charge current is received at a first voltage on a first force commutated synchronous rectifier, and the charge current is controlled by the first force commutated synchronous rectifier. An inductor is charged by the charge current, and a discharge current from the inductor is controlled by the second force commutated synchronous rectifier. In this manner, two forced commutation synchronous rectifiers can be used in such a way that a converter can efficiently process power in two directions.

The forced commutation method is more efficient. Since no series diode is required when using the force commutated switch, the efficiency improves significantly since typically the FET losses are much lower than the rectifier losses. Lower power dissipation reduces the weight of the power devices since less heat sink material is required and components may be packaged more densely. In this manner, spacecraft weight can be reduced since less thermal management hardware is required. Furthermore, by using the synchronous rectifier bi-directional converter described herein, power can flow either from the AC electrical bus to the DC electrical bus or from the DC electrical bus to the AC electrical bus.

In an embodiment, a synchronous rectifier bi-directional converter system comprises an inductor coupled to a first force commutated synchronous rectifier. The first force commutated synchronous rectifier is operable to eliminate reverse recovery time in a diode by force commutating a commutation current from a cathode terminal of the diode to an anode terminal of the diode while switching off a component associated with the diode. The synchronous rectifier bi-directional converter system further comprises a second force commutated synchronous rectifier coupled to the inductor and the first force commutated synchronous rectifier and is operable to eliminate reverse recovery time in a diode by force commutating a commutation current from a cathode terminal of the diode to an anode terminal of the diode while switching off a component associated with the diode.

In another embodiment, a method for bi-directional voltage conversion receives a charge current at a first voltage on a first force commutated synchronous rectifier, and controls the charge current with the first force commutated synchronous rectifier. The method further charges an inductor with the charge current, and controls a discharge current from the inductor using the second force commutated synchronous rectifier.

In yet another embodiment, a method for using a synchronous rectifier bi-directional converter system receives a first current at a first voltage, and controls flow of the first current into an inductor with a first force commutated synchronous rectifier coupled to the inductor. The method further controls flow of a second current from the inductor with a second force commutated synchronous rectifier coupled to the inductor and the first force commutated synchronous rectifier, and regulates a second voltage at an output of the inductor.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
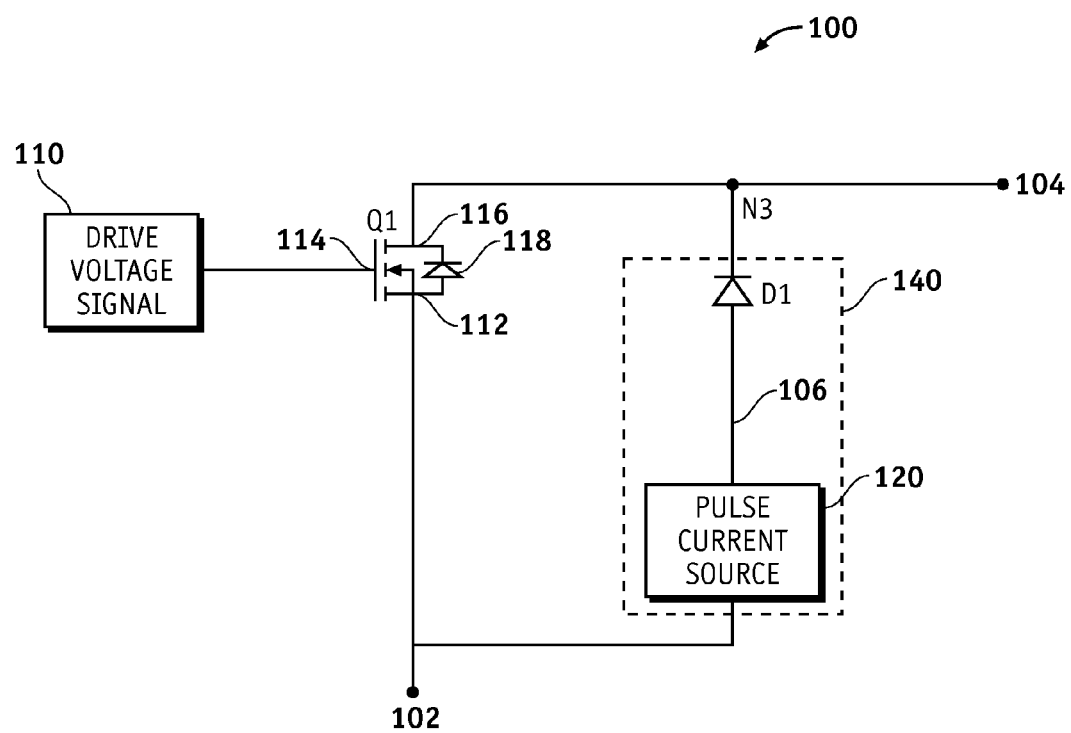
FIG. 1 is an illustration of an exemplary force commutated synchronous rectifier according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to circuit design, and other functional aspects of the systems (and the individual operating components of the systems) may not be described in detail herein. In addition, those skilled in the art will appreciate that embodiments of the present disclosure may be practiced in conjunction with a variety of computational hardware and software, and that the embodiments described herein are merely example embodiments of the disclosure.

Embodiments of the disclosure are described herein in the context of a practical non-limiting application, namely, voltage conversion on a satellite or a spacecraft. Embodiments of the disclosure, however, are not limited to such satellite or spacecraft applications, and the techniques described herein may also be utilized in other applications. For example but without limitation, embodiments may be applicable to various voltage conversion applications and circuits, vehicles, automobiles, aircraft, ships, boats, buildings, electrical equipment, electric motors, battery operated and augmented vehicles and vehicle systems, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Embodiments of the disclosure provide two forced commutation synchronous rectifiers that can be used in such a way that a converter can efficiently process power in two directions. For example, a bi-directional converter can be used as both the discharge regulator to maintain constant electrical bus voltage during eclipse and then the same converter can be used to regulate charge current to the battery when a solar array is in sunlight. The technique described herein makes possible extremely efficient bi-directional converters that can, for example but without limitation, regulate a charge current of a battery in sunlight mode of a spacecraft and regulate an electrical bus from the battery in eclipse mode of a space station with a single converter. Such a single converter may be used rather than separate hardware for regulating the charge current and the electrical bus in existing systems. By employing synchronous rectification, embodiments of the disclosure can be more efficient than previous generations of spacecraft electrical bus regulation hardware.

According to various embodiments of the disclosure, a synchronous rectifier bi-directional converter may be used as a building block that can be used in, for example but without limitation, DC-DC converters that process power in both directions, in DC-AC converters that can process power in both directions, and the like. For example but without limitation, the synchronous rectifier bi-directional converter may be operated as a bi-directional synchronous buck converter operating from +200V and −200V rails controlled in such a way to produce an AC voltage, two converters can be operated from a single 200V rail if they are operated 180 degrees out of phase, and the like.

A synchronous rectifier bi-directional converter disclosed herein can allow power to flow from a first electrical bus to a second electrical bus and from the second electrical bus to the first electrical bus. The first electrical bus may comprise a higher voltage than the second electrical bus, or the second electrical bus may comprise a higher voltage than the first electrical bus. The first electrical bus may comprise, for example but without limitation, an AC electrical bus, a DC electrical bus, and the like. The first electrical bus may comprise, for example but without limitation, an AC electrical bus, a DC electrical bus, and the like.

Bi-directional converters operating from a high voltage (e.g., greater than 60V) generally must have a rectifier in series with each of the FETs to eliminate severe switching losses associated with a reverse recovery of the FETs. Parallel rectifiers are required to allow inductor current to flow during the time that all FETs are turned off. Embodiments of the disclosure comprise a bi-directional synchronous converter comprising a buck/boost regulator where two power switches are each a force commutated synchronous rectifier. The force commutated synchronous rectifier allows current to flow in either direction without causing high switching losses associated with a recovery time of a body diode of a FET used for the force commutated synchronous rectifier that operates as a rectifier.

When the bi-directional synchronous converter is processing power from an electrical bus to charge a battery, the bi-directional synchronous converter operates as a buck regulator and a low side switch operates as a rectifier while the high side switch operates as a buck converter power switch. Similarly, when the battery is supplying power to the electrical bus, the bi-directional synchronous converter operates as a boost converter where the high side switch operates as a rectifier while the high side switch operates as a power switch.

FIG. 1 is an illustration of an exemplary force commutated synchronous rectifier 100 according to an embodiment of the disclosure. The force commutated synchronous rectifier 100 comprises a switching component, such as a field effect transistor (FET) Q1 electrically coupled to a forced commutation circuit 140. The FET Q1 comprises a source terminal 112, a gate terminal 114, a drain terminal 116, and an intrinsic body diode 118. For example but without limitation, the FET Q1 shown in FIG. 1 comprises an n-type FET, and, an anode of the body diode is connected to the source terminal 112 and a cathode of the intrinsic body diode 118 is connected to the drain terminal 116. In embodiments where the FET Q1 is a p-type FET, a direction of the intrinsic body diode 118 may be reversed, such that a cathode of the intrinsic body diode 118 is connected to a source terminal of the p-type FET and an anode of the body diode is connected to a drain terminal of the p-type FET.

While the present disclosure utilizes an n-type FET as an example, it should be appreciated that the FET Q1 may represent any switching component, such as the n-type FET, a p-type FET, or a switch, that comprises an intrinsic body diode that may have an associated reverse recovery time. In one embodiment, the switching component may be a rectifier switch used in power supply topologies.

Typically, n-type FETs allow a current to flow between the source terminal 112 and the drain terminal 116 when the gate terminal 114 is supplied with a voltage greater than a threshold voltage associated with switching on the FET. When the voltage supplied to the gate terminal 114 is reduced to below the threshold voltage or is removed completely, the FET is switched off and the current flowing between the source terminal 112 and the drain terminal 116 stops flowing. If the current is flowing from the source terminal 112 to the drain terminal 116 when the FET is switched off, the intrinsic body diode 118 of the FET requires a period of time to recover since the current was flowing in the forward-bias direction of the body diode. This is called the reverse recovery time. However, if the current is flowing from the drain terminal 116 to the source terminal 112 when the FET is switched off, there is no reverse recovery time needed since the current was already flowing in the reverse-bias direction of the intrinsic body diode 118. Using the concepts described above, the reverse recovery time of a diode can be eliminated by forced commutating a current from a cathode terminal of a diode to an anode terminal of the diode during the switch-off event associated with the FET.

The gate terminal 114 of the FET Q1 is electrically coupled to a drive voltage signal 110, which controls the switching of the FET Q1. When the drive voltage signal 110 provides a threshold voltage to the gate terminal 114, the FET Q1 is switched on. When the gate terminal 114 of the FET Q1 does not have a voltage, the FET Q1 is switched off. A current is configured to flow into the source terminal 112 of the FET Q1 through an input terminal 102, while the current flowing out of the FET Q1 flows towards an output terminal 104.

As described above, the FET Q1 is electrically coupled to the forced commutation circuit 140. The forced commutation circuit 140 comprises a pulse current source 120 (selectively controlled forced commutation current source) and a commutation diode D1. The pulse current source 120 may be configured to generate a commutation current that is configured to be larger than the current entering through the input terminal 102. In one embodiment, the commutation current is a pulse current that is supplied from the force commutated synchronous rectifier 100 for a very brief period of time. The pulse current source 120 is electrically coupled to an anode terminal (not shown) of the commutation diode D1 at terminal 106.

The commutation diode D1 comprises the anode terminal, which is electrically coupled to the pulse current source 120 at the terminal 106. The commutation diode D1 also comprises a cathode terminal (not shown), which is electrically coupled to the drain terminal 116 of the FET Q1 and the output terminal 104 at node N3. In this way, the commutation diode D1 is in parallel with the FET Q1. It should be appreciated that the commutation diode D1 should be arranged in such a manner that the cathode terminal of the commutation diode D1 should be connected to the cathode terminal of the intrinsic body diode 118.

The force commutated synchronous rectifier 100 may operate in four phases. In the first phase, both the FET Q1 is switched off and the pulse current source 120 is switched off such that the pulse current source is not supplying a commutation current. In this phase, input current enters the force commutated synchronous rectifier 100 at the input terminal 102, flows through the commutation diode D1, and outputs the force commutated synchronous rectifier 100 at the output terminal 104.

In the second phase, the FET Q1 is switched on and the pulse current source 120 remains off. In this phase, input current enters at the input terminal 102 and flows through the FET Q1 from the source terminal 112 to the drain terminal 116, and exits through output terminal 104. The current no longer flows through the commutation diode D1 since the voltage drop across the FET Q1 is smaller than the forward voltage of the commutation diode D1.

In the third phase, while the FET Q1 is on, the pulse current source 120 is switched on. In this phase, input current enters the force commutated synchronous rectifier 100 at the input terminal 102, and flows through the pulsed current source 120 and commutation diode D1. In addition, the pulse current source 120 supplies a commutation current to that flows through D1 and the FET Q1. At the node N3, the input current flows to the output terminal, while the commutation current passes through the FET Q1 from the drain terminal 116 to the source terminal 112.

In the fourth phase, the FET Q1 is switched off while the commutation current is flowing through the FET Q1 from the drain terminal 116 to the source terminal 112. In this phase, the commutation current stops flowing and the input current flows through the commutation diode D1 and outputs at the output terminal 104. To eliminate the reverse recovery time associated with the body diode of the FET Q1, the FET Q1 should be switched off while a current is flowing through the FET Q1 from the drain terminal 116 to the source terminal 112 (opposite the direction of the intrinsic body diode 118). By following the sequence of events delineated by the four phases, the FET Q1 is switched off while the commutation current is flowing through the FET Q1 from the drain terminal 116 to the source terminal 112. Accordingly, the reverse recovery time associated with the FET Q1 is eliminated.

The force commutated synchronous rectifier 100 described above may be utilized as a building block for a variety of applications. In particular, switching applications that utilize a switching component that comprises an intrinsic body diode may perform more efficiently through the utilization of the force commutated synchronous rectifier 100 described above. In addition, switching regulators, such as buck converters, boost converters, and buck-boost converters, may also utilize the forced commutation assembly described above.

Conventional switching regulators may use a rectifier to provide a current path for the inductor current during the off time of a main FET. With modern improvements, it has become practical to replace rectifiers with FETs as the reverse recovery time of the FET switches have become quite small with very little energy dissipated as a result. However, in high voltage applications, reverse recovery times are relatively substantial, causing significant power dissipation as well as limits on the switching frequency of the FET. To eliminate the reverse recovery time of an intrinsic body diode a FET being utilized as a rectifier in high voltage switching regulator applications, such as a boost converter, a conventional rectifier or synchronous switched FET may be replaced with the force commutated synchronous rectifier 100 described in FIG. 1. In rectification applications involving a switch, the rectification cycles through the four phases described above. This cycle may be referred to as a rectifier switch cycle. The fourth phase occurs at the switch-off edge of the rectifier switch cycle. In high voltage rectifier applications, the voltage applied to the switch, such as the FET, may be greater than 60 V.

Figure 2:
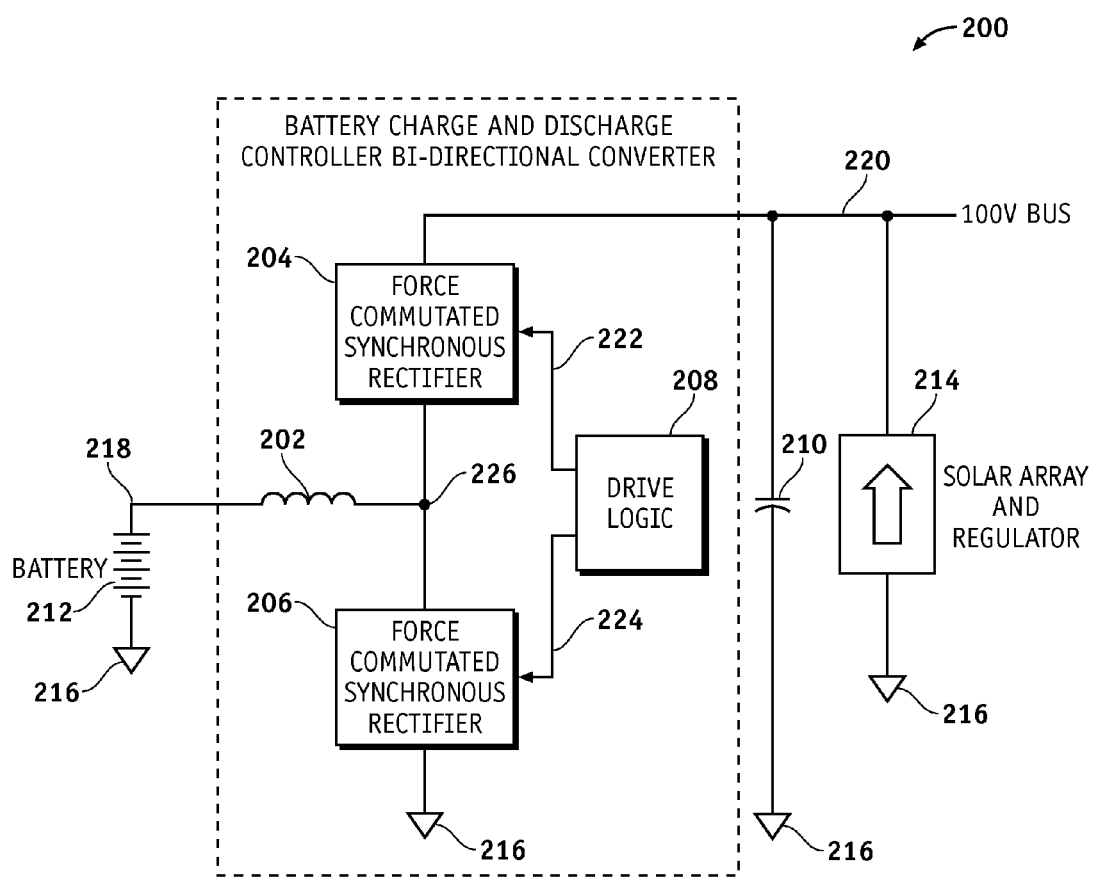
FIG. 2 is an illustration of an exemplary synchronous rectifier bi-directional converter system according to an embodiment of the disclosure.

FIG. 2 is an illustration of an exemplary synchronous rectifier bi-directional converter system 200 according to an embodiment of the disclosure. The synchronous rectifier bi-directional converter system 200 comprises an inductor 202, a first force commutated synchronous rectifier 204, a second force commutated synchronous rectifier 206, drive logic 208, a boost side capacitor 210, a battery 212, and a solar array

214. FIG. 2 shows a partial schematic of a power stage for the synchronous rectifier bi-directional converter system 200 operating as a battery charge/discharge regulator.

The inductor 202 is coupled to the first force commutated synchronous rectifier 204 and the second force commutated synchronous rectifier 206 via an electrical bus 226, and is coupled to the battery 212 via a link 218. The first force commutated synchronous rectifier 204 is coupled to the drive logic 208 via a link 222, and the second force commutated synchronous rectifier 206 is coupled to the drive logic 208 via a link 224. The boost side capacitor 210 is coupled to the solar array 214 and the first force commutated synchronous rectifier 204 via the electrical bus 220. The battery 212, the second force commutated synchronous rectifier 206, the boost side capacitor 210, and the solar array 214 are each connected to the common ground 216 respectively.

In a spacecraft application, a voltage of an electrical bus 220 is higher than a voltage of the battery 212. Therefore, when the solar array 214 is producing insufficient power to meet the spacecraft needs, the synchronous rectifier bi-directional converter system 200 draws power from the battery 212 to provide a necessary current for the electrical bus 220. When the solar array 214 has excess power available, the synchronous rectifier bi-directional converter system 200 becomes a buck regulator to charge the battery 212. Therefore, since current must flow out of the battery 212 to power the electrical bus 220 and into the battery 212 to charge the battery 212, the synchronous rectifier bi-directional converter system 200 is a bi-directional power processor. Furthermore, since the switching rectifiers are FETs that are turned on at the appropriate times, the synchronous rectifier bi-directional converter system 200 is synchronous rectified.

Since the voltage drop of a FET is generally much lower than the voltage drop of a rectifier, the synchronous rectifier bi-directional converter system 200 can achieve much higher efficiency than a conventional buck or boost regulator. That is, when boosting from an 80V battery to a 100V electrical bus, an existing boost regulator will have an efficiency of approximately 96.5%. The synchronous rectifier bi-directional converter system 200 may have an efficiency of approximately 98%. This efficiency improvement is a result of reduced rectifier losses and reduced switching losses associated for the synchronous rectifier bi-directional converter system 200.

Figure 3:
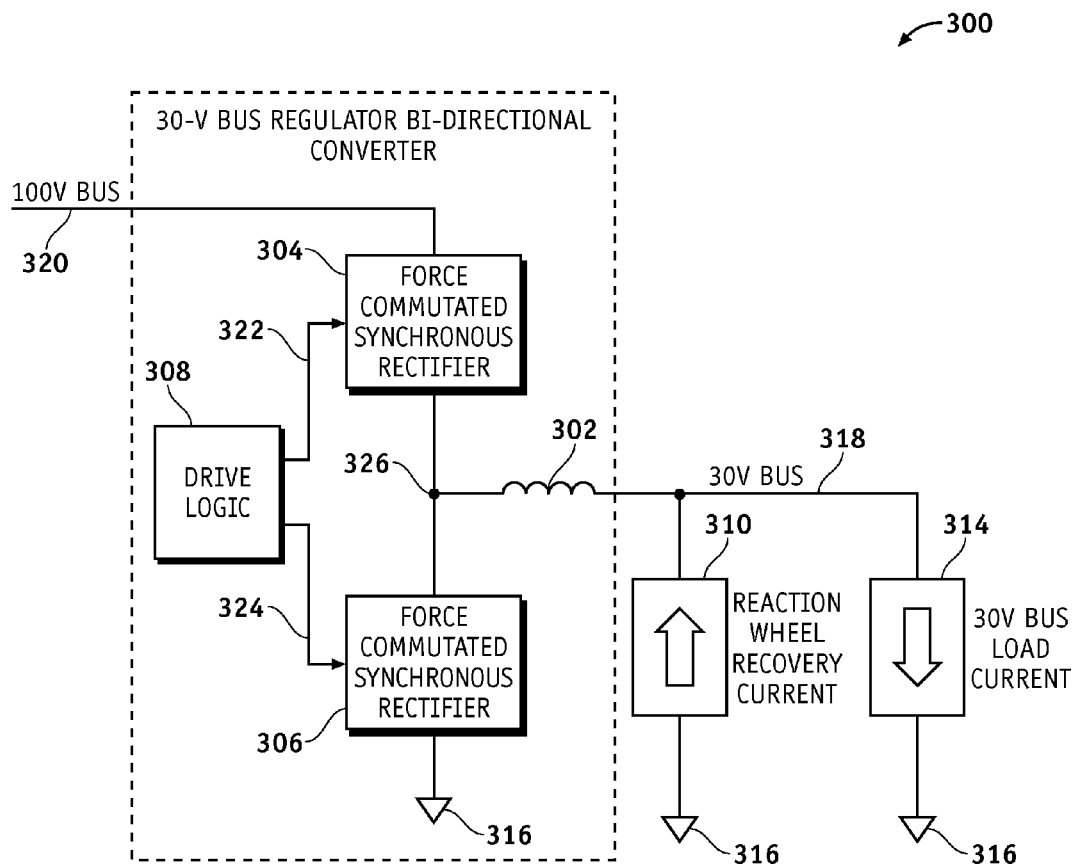
FIG. 3 is an illustration of an exemplary synchronous rectifier bi-directional converter system according to an embodiment of the disclosure.

FIG. 3 is an illustration of an exemplary synchronous rectifier bi-directional converter system 300 according to an embodiment of the disclosure. The synchronous rectifier bi-directional converter system 300 comprises an inductor 302 (202 in FIG. 2), a first force commutated synchronous rectifier 304 (204 in FIG. 2) a second force commutated synchronous rectifier 306 (206 in FIG. 2), drive logic 308 (208 in FIG. 2), a reaction wheel 310, and a spacecraft load 314. FIG. 3 shows a partial schematic of a power stage for the synchronous rectifier bi-directional converter system 300 operating as a 30V electrical bus 318 regulator.

The inductor 302 is coupled to the first force commutated synchronous rectifier 304 and the second force commutated synchronous rectifier 306 via an electrical bus 326, and is coupled to the reaction wheel 310, and the spacecraft load 314 via the 30V electrical bus 318. The first force commutated synchronous rectifier 304 is coupled to the drive logic 308 via a link 322, and the second force commutated synchronous rectifier 306 is coupled to the drive logic 308 via a link 324. The reaction wheel 310, the spacecraft load 314, and the second force commutated synchronous rectifier 306, are each connected to the common ground 316 respectively.

The synchronous rectifier bi-directional converter system 300 functions as a buck regulator to transform a 100V electrical bus 320 operating at 100V to the 30V electrical bus 318. In some cases, an energy from the reaction wheel 310 may be dumped back into the 30V electrical bus 318 in such a way that power dumped from the reaction wheel 310 exceeds the 30V electrical bus 318 for the spacecraft load 314. In this case, the synchronous rectifier bi-directional converter system 300 operates as a boost shunt regulator to return excess power to the 100V electrical bus 320 where there is substantially always sufficient spacecraft load to absorb the power.

Figure 4:
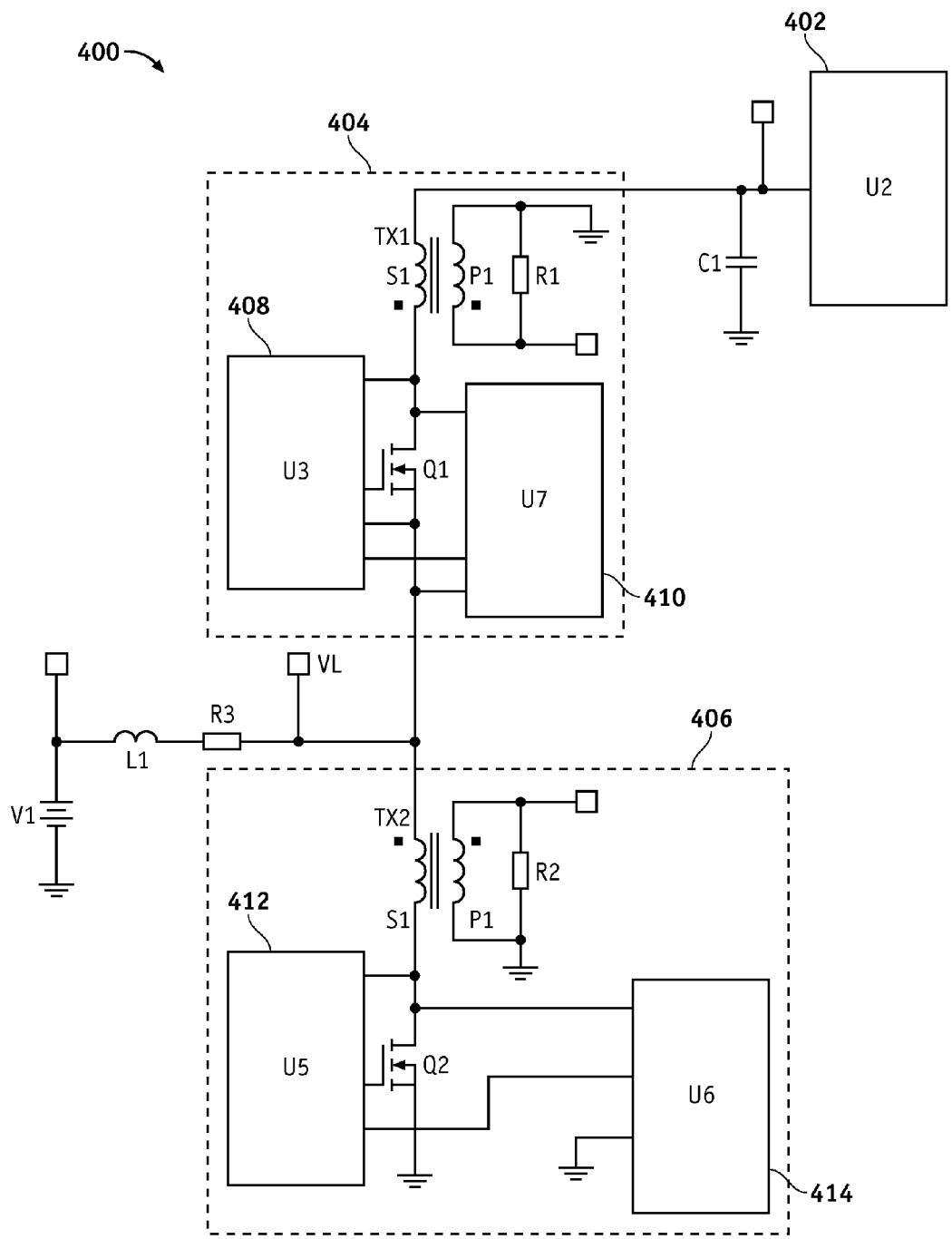
FIG. 4 is an illustration of an exemplary synchronous rectifier bi-directional converter system according to an embodiment of the disclosure.

FIG. 4 is an illustration of an exemplary synchronous rectifier bi-directional converter system 400 according to an embodiment of the disclosure. The synchronous rectifier bi-directional converter system 400 comprises an inductor L1 coupled to battery V1 and a resistor R3, a first force commutated synchronous rectifier 404 (similar to 304 in FIG. 3), and a second force commutated synchronous rectifier 406 (similar to 306 in FIG. 3).

FIG. 4 shows a SPICE model of the synchronous rectifier bi-directional converter system 400 (system 400) configured to operate as a battery charge/discharge regulator. As shown in FIG. 4, the first force commutated synchronous rectifier 404 comprises a high side forced commutation circuit 410 (U7) and a high side driver 408 (U3) coupled to a transformer TX1. The transformer TX1 comprises a primary P1 and a secondary S1, and a resistor R1 and may be coupled to a capacitor C1 and a bus 402 (U2). Similarly, the first force commutated synchronous rectifier 406 comprises a low side forced commutation circuit 414 (U6) and a low side driver 412 (U5) coupled to a transformer TX2. The transformer TX2 comprises a primary P1 and a secondary S1, and a resistor R2.

A high side FET (or switch) Q1 and a low side FET (or switch) Q2 are the synchronous switches that either connect VL (right side of the inductor) to an output or ground respectively. The high side forced commutation circuit 410 (U7) and the low side forced commutation circuit 414 (U6) prevent body diode conduction in the high side FET Q1 and in the low side FET Q2 respectively. The high side forced commutation circuit 410 and the low side forced commutation circuit 414 process a pulse-width modulation (PWM) signal (DR1) to create drive signals for the low side FET Q2 and the high side FET Q1 respectively. The low side FET Q2 is driven by a signal that is substantially in phase with the PWM signal (DR1). The high side driver 408 (U3) drives the high side FET Q1 with a signal that is essentially an inverted version of the DR1.

In addition to driving the low side FET Q2, the low side driver 412 (U5) delays the arrival of the gate drive signal so that the high side FET Q1 has time to turn off before the low side FET Q2 turns on. Similarly, the low side forced commutation circuit 414 delays the turn-on of high side FET Q1 so that the low side FET Q2 has sufficient time to turn off before the high side FET Q1 turns on.

The PWM signal from a PWM control circuit (not shown) uses voltage and current feedback to regulate the electrical bus voltage by adjusting pulse a width of the DR1. As DR1 duty cycle increases, the output electrical bus voltage increases. As the DR1 duty cycle decreases, the electrical bus voltage decreases.

When the system 400 is functioning as a boost converter to supply current to the 100V electrical bus, the low side FET Q2 has current flowing from a drain to a source of the low FET Q2 and is therefore shown as positive current into the low side FET Q2. Since the current flow from the drain to the source of the low FET Q2, there is no chance that the body diode of the low side FET Q2 will have current flowing in it when the low side FET Q2 is turned off. Therefore, although the low side forced commutation circuits 414 is attached and operating, it does not perform a useful function for a boost converter operating mode.

The high side FET Q1 current flows from to a source to a drain of the FET Q1. Therefore at turn-off, it is essential for the high side forced commutation circuit 410 to reverse the current in the FET before the device is turned off to prevent body diode conduction. When the high side forced commutation circuit 410 is activated, the current reverses in the FET followed by the turn-off of the high side FET Q1. Then, a current of the inductor L1 continues to flow in the high side forced commutation circuit 410 until the low side FET Q2 is turned on.

When the system 400 is functioning as a buck converter to charge the battery, the high side FET Q1 has current flowing from drain to source and is therefore shown as positive current into the high side FET Q1. Since the current flow from drain to source, there is no chance that the body diode of the high side FET Q1 will have current flowing in it when the high side FET Q1 is turned off. Therefore, although the high side forced commutation circuit 410 is attached and operating, it does not perform a useful function for the buck converter operating mode.

The low side FET Q1 current flows from to source to drain (e.g., as can be indicated by negative current). Therefore at turn-off, it is essential for the forced commutation circuit to reverse the current in the low side FET Q1 before the device is turned off to prevent body diode conduction. When the commutation circuit 410 is activated, the current reverses in the low side FET Q1 followed by the turn-off of the high side FET Q1. Then, a current in the inductor L1 continues to flow in the commutation circuit 410 until the low side FET Q2 is turned on.

In summary, two forced commutation circuits are required to efficiently operate a synchronous rectified bi-directional converter: (1) the high side forced commutation circuit 410 in parallel with the high side FET Q1 is necessary to avoid losses associated with the reverse recovery characteristics of the high side FET Q1 when the system 400 operates as a boost converter to regulate the electrical bus, and (2) the low side forced commutation circuit 414 in parallel with the low side switch Q2 is necessary to avoid losses associated with the reverse recovery characteristics of the high side FET Q1 when the synchronous rectifier bi-directional converter system 400 operates as a boost converter to regulate the electrical bus.

Although this principal is illustrated using a boost/buck regulator, it can be applied to other converters such as, for example but without limitation, a buck-boost (inverting flyback) converter, a non-inverting flyback, a Cuk converter, or a coupled inductor buck converter. A basic principal described herein is that two (or more) forced commutation circuits can be used to convert nearly any switching regulator into a synchronous rectified bi-directional converter.

Figure 5:
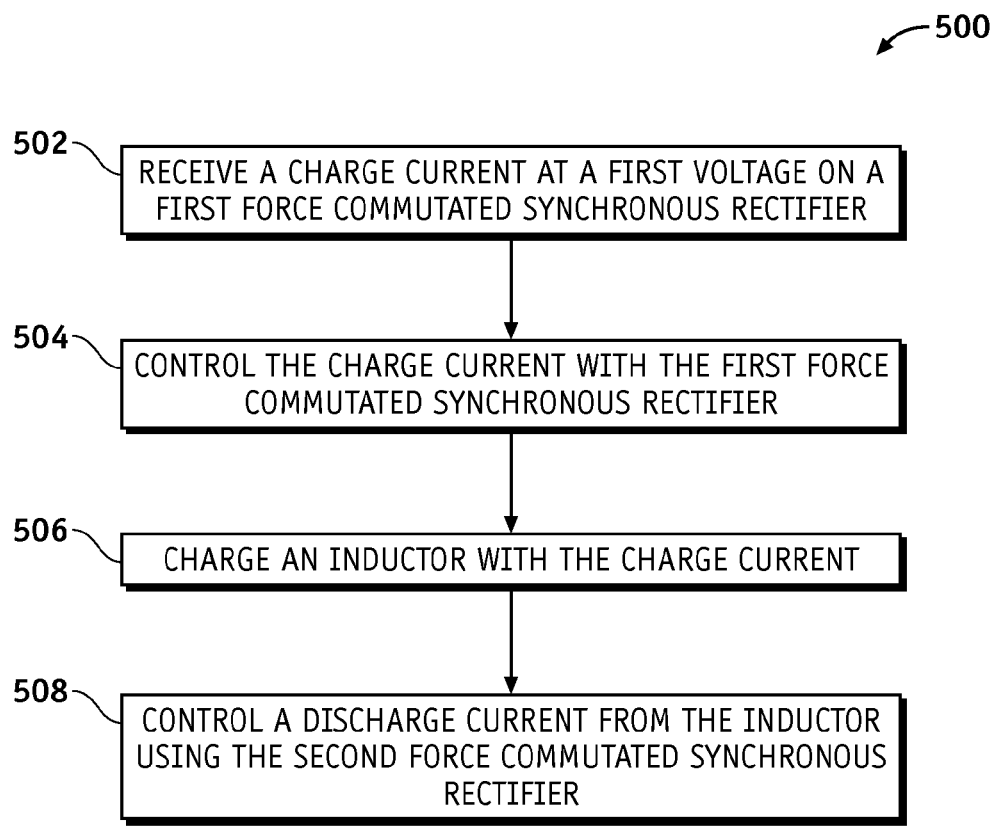
FIG. 5 is an illustration of an exemplary flowchart showing a bi-directional voltage conversion process according to an embodiment of the disclosure.

FIG. 5 is an illustration of an exemplary flowchart showing a bi-directional voltage conversion process 500 (process 500) according to an embodiment of the disclosure. The various tasks performed in connection with process 500 may be performed mechanically, by software, hardware, firmware, or any combination thereof. It should be appreciated that the process 500 may include any number of additional or alternative tasks, the tasks shown in FIG. 5 need not be performed in the illustrated order, and the process 500 may be incorporated into a more comprehensive procedure or process having additional functionality not described in detail herein.

For illustrative purposes, the following description of the process 500 may refer to elements mentioned above in connection with FIGS. 1-4. In practical embodiments, portions of the process 500 may be performed by different elements of the systems 100-400 such as: the source terminal 112, the gate terminal 114, the drain terminal 116, the intrinsic body diode 118, the inductor 302/L1, the first force commutated synchronous rectifier 304/404, the second force commutated synchronous rectifier 306/406, etc. The process 500 may have functions, material, and structures that are similar to the embodiments shown in FIGS. 1-4. Therefore common features, functions, and elements may not be redundantly described here.

Process 500 may begin by receiving a charge current at a first voltage on the first force commutated synchronous rectifier 304/404 (task 502).

Process 500 may continue by controlling the charge current with the first force commutated synchronous rectifier 304/404 (task 504).

Process 500 may continue by charging the inductor 302/L1 with the charge current (task 506).

Process 500 may continue by controlling a discharge current from the inductor 302/L1 using the second force commutated synchronous rectifier 306/406 (task 508).

Figure 6:
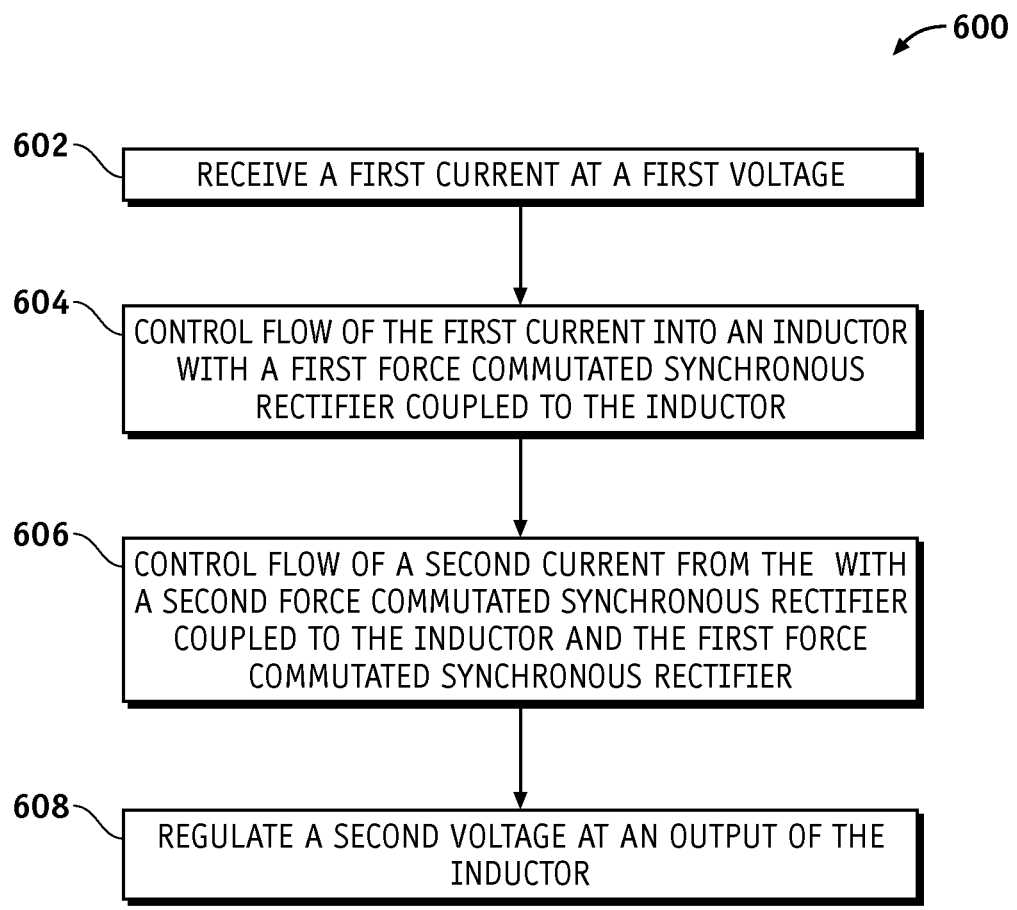
FIG. 6 is an illustration of an exemplary flowchart showing a process for using a bi-directional voltage conversion system according to an embodiment of the disclosure.

FIG. 6 is an illustration of an exemplary flowchart showing a process 600 for using a bi-directional voltage conversion system according to an embodiment of the disclosure. The various tasks performed in connection with the process 600 may be performed mechanically, by software, hardware, firmware, or any combination thereof. It should be appreciated that the process 600 may include any number of additional or alternative tasks, the tasks shown in FIG. 6 need not be performed in the illustrated order, and the process 600 may be incorporated into a more comprehensive procedure or process having additional functionality not described in detail herein.

For illustrative purposes, the following description of the process 600 may refer to elements mentioned above in connection with FIGS. 1-4. In practical embodiments, portions of the process 600 may be performed by different elements of the systems 100-400 such as: the source terminal 112, the gate terminal 114, the drain terminal 116, the intrinsic body diode 118, the inductor 302/L1, the first force commutated synchronous rectifier 304/404, the second force commutated synchronous rectifier 306/406, etc. The process 600 may have functions, material, and structures that are similar to the embodiments shown in FIGS. 1-4. Therefore common features, functions, and elements may not be redundantly described here.

Process 600 may begin by receiving a first current at a first voltage (task 602).

Process 600 may continue by controlling flow of the first current into the inductor 302/L1 with the first force commutated synchronous rectifier 304/404 coupled to the inductor 302/L1 (task 604).

Process 600 may continue by controlling flow of a second current from the inductor 302/L1 with the second force commutated synchronous rectifier 306/406 coupled to the inductor 302/L1 and the first force commutated synchronous rectifier 304/404 (task 606).

Process 600 may continue by regulating a second voltage at an output of the inductor 302/L1 (task 608).

In this way, embodiments of the disclosure provide two forced commutation synchronous rectifiers can be used in such a way that a converter can efficiently process power in two directions. The forced commutation method is more efficient. Since no series diode is required when using the force commutated switch, the efficiency improves dramatically since typically the FET losses are much lower than the rectifier losses. Lower power dissipation reduces the weight of the power devices since less heat sink material is required and components may be packaged more densely. In this manner, spacecraft weight can be reduced since less thermal management hardware is required.

By using the synchronous rectifier bi-directional converter described herein, power can flow either from the AC electrical bus to the DC electrical bus or from the DC electrical bus to the AC electrical bus.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-4 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A synchronous rectifier bi-directional converter system comprising:
   an inductor configured for bi-directional conversion;
   a first force commutated synchronous rectifier coupled directly to the inductor and comprising a first body diode and operable to eliminate reverse recovery time in the first body diode so there is no reverse recovery time by force commutating a commutation current from a cathode terminal of the first body diode to an anode terminal of the first body diode such that no current flows in the first body diode while switching off a component associated with the first body diode; and
   a second force commutated synchronous rectifier coupled directly to the inductor and the first force commutated synchronous rectifier and comprising a second body diode and operable to eliminate reverse recovery time in the second body diode so there is no reverse recovery time by force commutating a commutation current from a cathode terminal of the second body diode to an anode terminal of the second body diode such that no current flows in the second body diode while switching off a component associated with the second body diode,
   the first force commutated synchronous rectifier and the second force commutated synchronous rectifier each comprising a field effect transistor (FET) switch coupled in parallel to a force commutation circuit consisting of a commutation diode coupled in series at an anode of the commutation diode to an output terminal of a controlled pulsed current source, and the controlled pulsed current source generates the commutation current greater than an input current into an input terminal of the controlled pulsed current source to eliminate the reverse recovery time.

2. The synchronous rectifier bi-directional converter system according to claim 1, further comprising a drive logic coupled to the first force commutated synchronous rectifier and the second force commutated synchronous rectifier, and operable to drive the first force commutated synchronous rectifier and the second force commutated synchronous rectifier.

3. The synchronous rectifier bi-directional converter system according to claim 1, wherein the first force commutated synchronous rectifier is further coupled to a first electrical bus, the second force commutated synchronous rectifier is further coupled to a ground, and the inductor is further coupled to a second electrical bus.

4. The synchronous rectifier bi-directional converter system according to claim 3, wherein the first electrical bus has a higher voltage than the second electrical bus.

5. The synchronous rectifier bi-directional converter system according to claim 3, wherein the first electrical bus is coupled to a solar array.

6. The synchronous rectifier bi-directional converter system according to claim 3, wherein the second electrical bus is coupled to at least one of: a battery, or a reaction wheel.

7. The synchronous rectifier bi-directional converter system according to claim 1, wherein the first force commutated synchronous rectifier and the second force commutated synchronous rectifier each comprise:
   the field effect transistor (FET) switch comprising a gate terminal, a drain terminal, a source terminal, and an intrinsic body diode comprising a cathode terminal and an anode terminal;
   the commutation diode electrically coupled in parallel to the FET switch such that a cathode of the commutation diode is electrically coupled to the cathode terminal of the intrinsic body diode; and
   the controlled pulsed current source electrically coupled to the commutation diode, and operable to pass a commutation current from the commutation diode to the FET switch while the FET switch is switched on, such that the commutation current passes from the cathode terminal of the intrinsic body diode to the anode terminal of the intrinsic body diode.

8. A method for bi-directional voltage conversion, the method comprising:
   receiving a charge current at a first voltage on a first force commutated synchronous rectifier coupled directly to an inductor configured for bi-directional conversion;
   controlling the charge current with the first force commutated synchronous rectifier such that no current flows in a first body diode of the first force commutated synchronous rectifier when off and there is no reverse recovery time in the first body diode;

charging the inductor with the charge current; and controlling a discharge current from the inductor using a second force commutated synchronous rectifier coupled directly to the inductor such that no current flows in a second body diode of the first force commutated synchronous rectifier when off and there is no reverse recovery time in the second body diode, the first force commutated synchronous rectifier and the second force commutated synchronous rectifier each comprising a field effect transistor (FET) switch coupled in parallel to a force commutation circuit consisting of a commutation diode coupled in series at an anode of the commutation diode to an output terminal of a controlled pulsed current source, and the controlled pulsed current source generates the commutation current greater than an input current into an input terminal of the controlled pulsed current source to eliminate the reverse recovery time.

9. The method according to claim 8, wherein the charge current is received from a first electrical bus.

10. The method according to claim 8, further comprising voltage regulating a second electrical bus using the charge current and the discharge current.

11. The method according to claim 10, further comprising voltage regulating the second electrical bus to a second voltage.

12. The method according to claim 11, wherein the second voltage is lower than the first voltage.

13. The method according to claim 8, wherein the first force commutated synchronous rectifier and the second force commutated synchronous rectifier each comprise:

the field effect transistor (FET) switch comprising a gate terminal, a drain terminal, a source terminal, and an intrinsic body diode comprising a cathode terminal and an anode terminal;

the commutation diode electrically coupled in parallel to the FET switch such that a cathode of the commutation diode is electrically coupled to the cathode terminal of the intrinsic body diode; and the controlled pulsed current source electrically coupled to the commutation diode, and operable to pass a commutation current from the commutation diode to the FET switch while the FET switch is switched on, such that the commutation current passes from the cathode terminal of the intrinsic body diode to the anode terminal of the intrinsic body diode.

14. A method for using a synchronous rectifier bi-directional converter system, the method comprising:

receiving a first current at a first voltage;

controlling flow of the first current into an inductor with a first force commutated synchronous rectifier coupled directly to the inductor such that no current flows in a first body diode of the first force commutated synchronous rectifier when off and there is no reverse recovery time in the first body diode, the inductor configured for bi-directional conversion;

controlling flow of a second current from the inductor with a second force commutated synchronous rectifier coupled directly to the inductor and the first force commutated synchronous rectifier such that no current flows in a second body diode of the first force commutated synchronous rectifier when off and there is no reverse recovery time in the second body diode; and regulating a second voltage at an output of the inductor, the first force commutated synchronous rectifier and the second force commutated synchronous rectifier each comprising a field effect transistor (FET) switch coupled in parallel to a force commutation circuit consisting of a commutation diode coupled in series at an anode of the commutation diode to an output terminal of a controlled pulsed current source, and the controlled pulsed current source generates the commutation current greater than an input current into an input terminal of the controlled pulsed current source to eliminate the reverse recovery time.

15. The method according to claim 14, further comprising coupling the output of the inductor to an electrical bus through the second force commutated synchronous rectifier.

16. The method according to claim 14, wherein the second voltage is an AC voltage.

17. The method according to claim 14, wherein the second voltage is a DC voltage.

18. The method according to claim 14, wherein the first voltage is an AC voltage.

19. The method according to claim 14, wherein the first voltage is a DC voltage.

20. The method according to claim 14, wherein the first force commutated synchronous rectifier and the second force commutated synchronous rectifier each comprise:

the field effect transistor (FET) switch comprising a gate terminal, a drain terminal, a source terminal, and an intrinsic body diode comprising a cathode terminal and an anode terminal;

the commutation diode electrically coupled in parallel to the FET switch such that a cathode of the commutation diode is electrically coupled to the cathode terminal of the intrinsic body diode; and the controlled pulsed current source electrically coupled to the commutation diode, and operable to pass a commutation current from the commutation diode to the FET switch while the FET switch is switched on, such that the commutation current passes from the cathode terminal of the intrinsic body diode to the anode terminal of the intrinsic body diode.

* * * * *